United States Patent [19]

Danford

[11] 4,329,543
[45] May 11, 1982

[54] COMMUNICATION SYSTEM

[75] Inventor: Glenn S. Danford, Oklahoma City, Okla.

[73] Assignee: Southwest Utilities, Inc., Oklahoma City, Okla.

[21] Appl. No.: 95,449

[22] Filed: Nov. 19, 1979

Related U.S. Application Data

[63] Continuation-in-part of Ser. No. 73,075, Sep. 6, 1979.

[51] Int. Cl.³ .............................................. H04M 9/08
[52] U.S. Cl. .............................. 179/1 HF; 179/99 A
[58] Field of Search ............. 179/1 HF, 37, 39, 81 B, 179/18 AD, 99 A, 1 H

[56] References Cited
U.S. PATENT DOCUMENTS 3,304,376 2/1967 Truby ................................. 179/1 H
3,743,791 7/1973 Duff et al. ......................... 179/81 B
3,976,847 8/1976 Bidlack et al. ................... 179/99 A Primary Examiner—Joseph A. Popek
Attorney, Agent, or Firm—Robert M. Hessin

[57] ABSTRACT

A communication system for combining telephone service with hands-free talk-back intercom service is disclosed. The telephone service includes a telephone exchange network having an outside trunk, an internal trunk, and a device for switching the telephones within the system between either the outside trunk or the internal trunk in response to appropriate signals from the telephones. The intercom network generally includes a main distribution station associated with various telephones and transducers. Various embodiments of the system, having differing numbers of the above elements, are disclosed.

15 Claims, 12 Drawing Figures

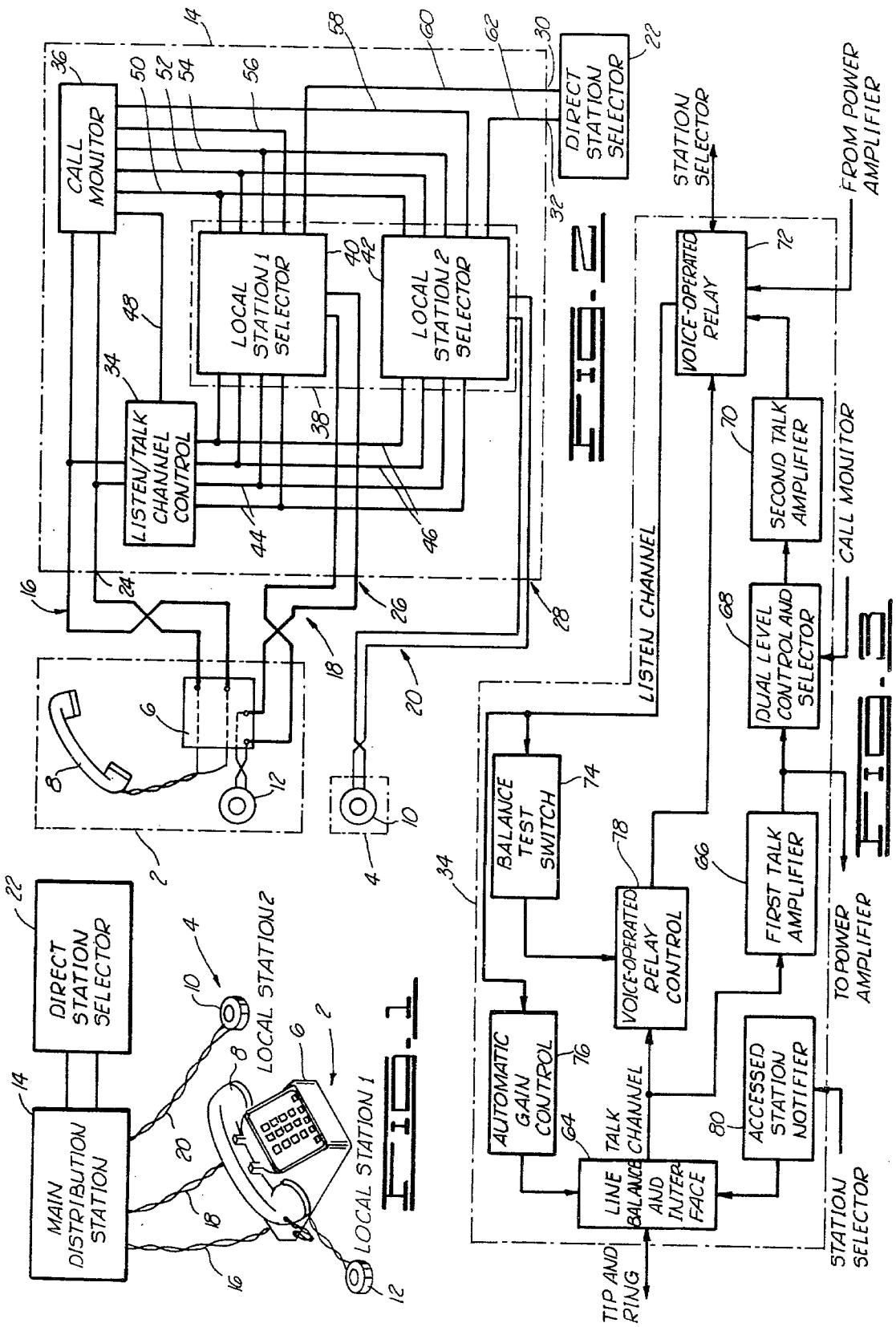

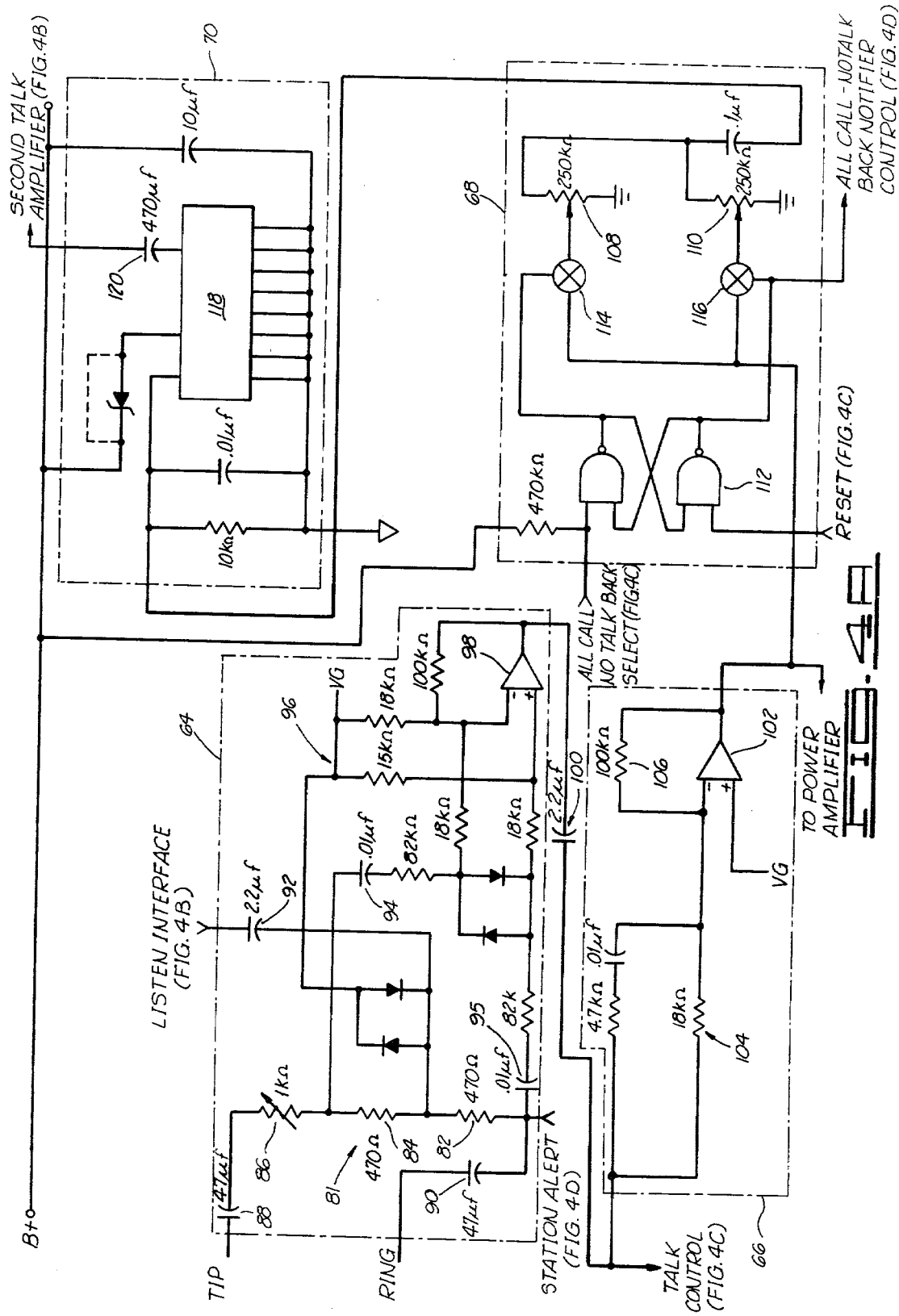

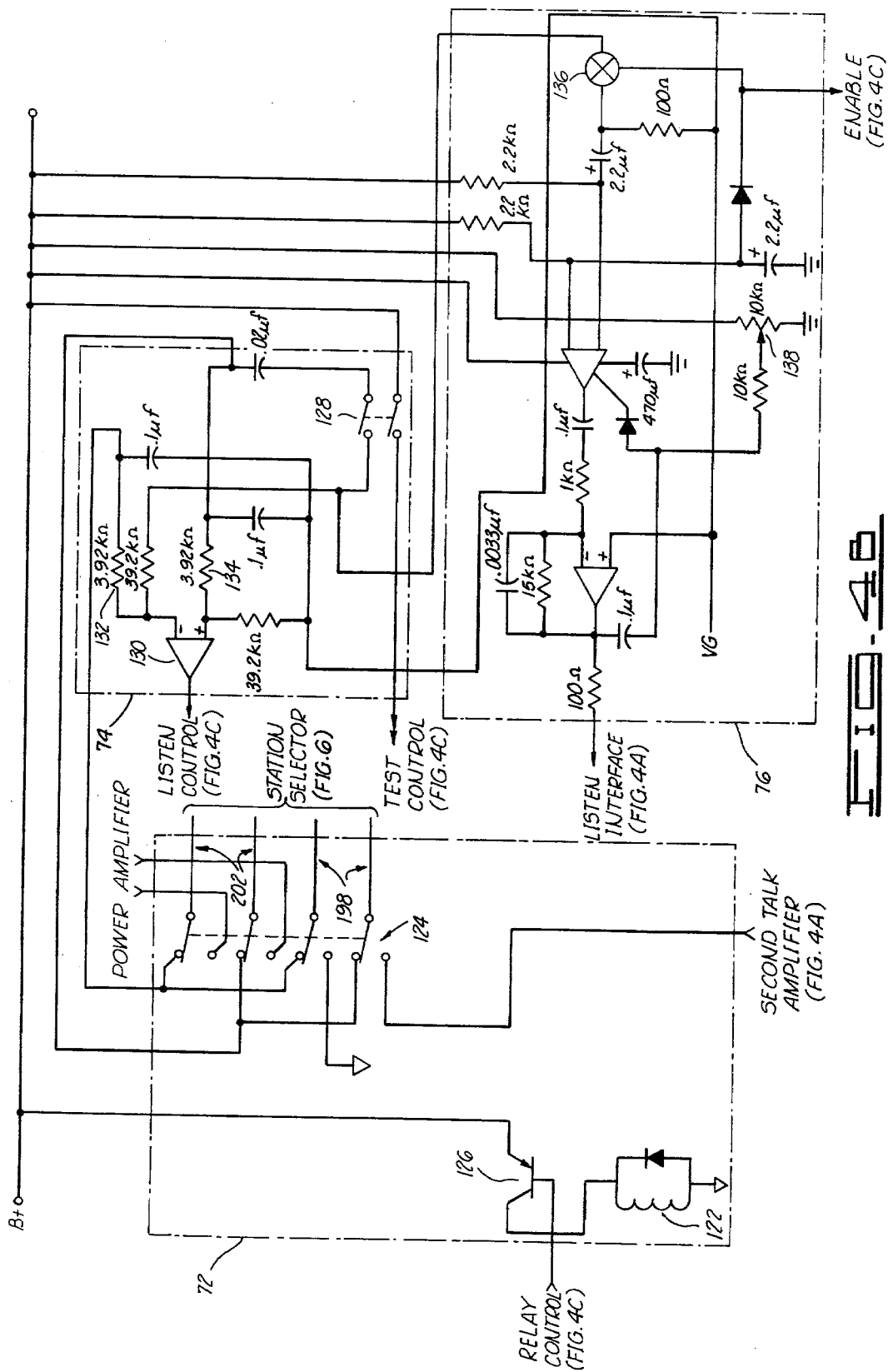

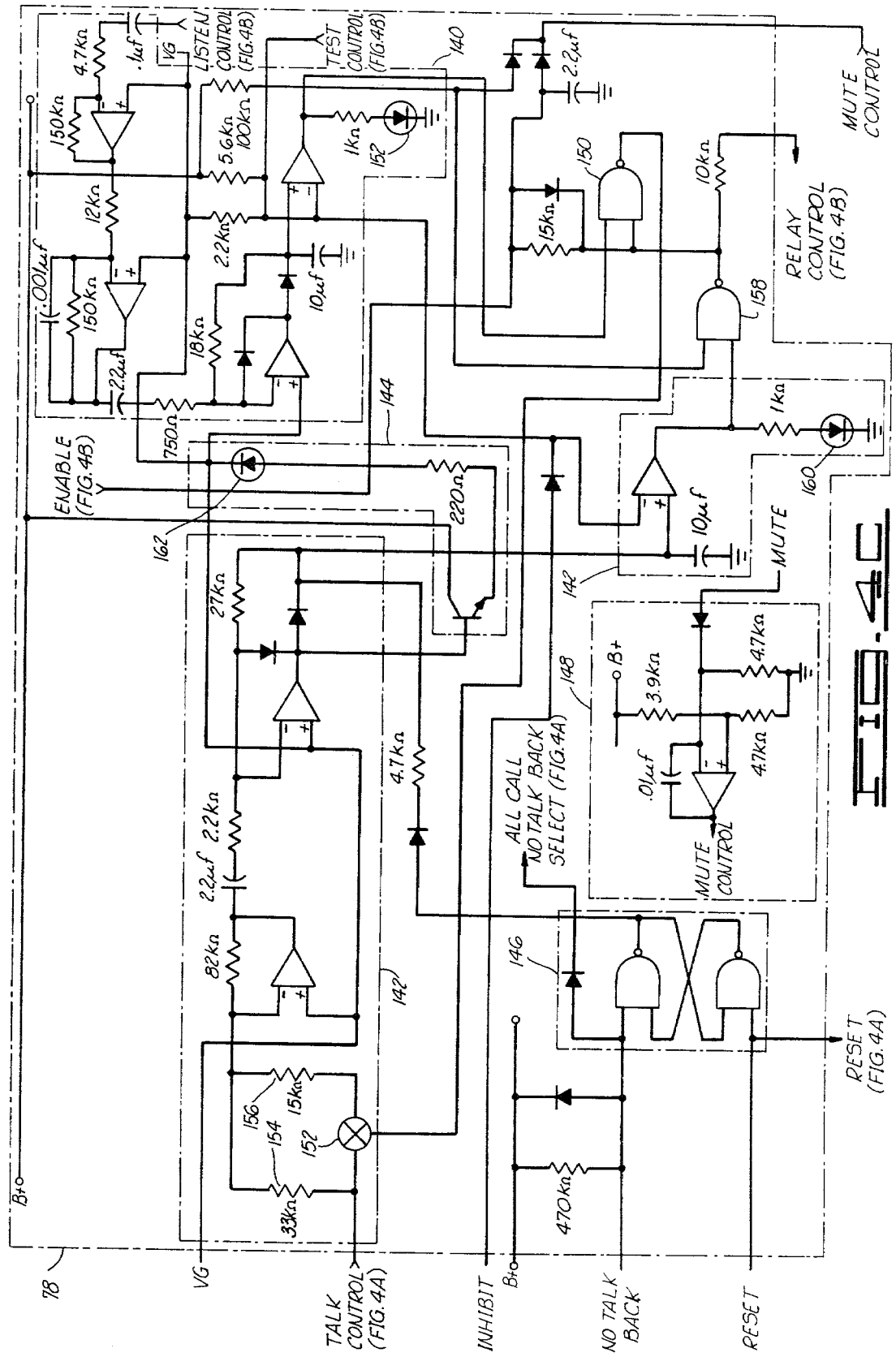

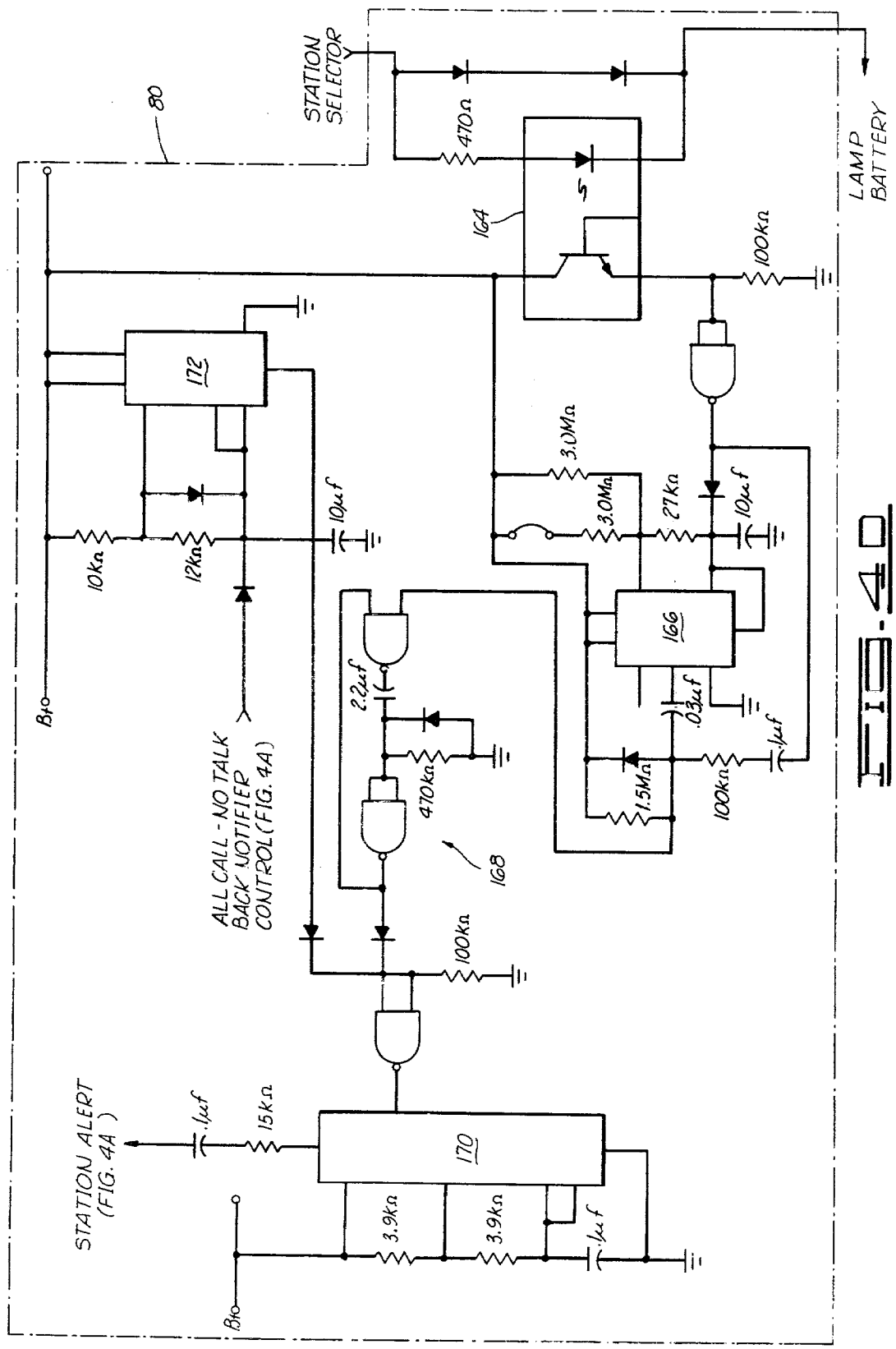

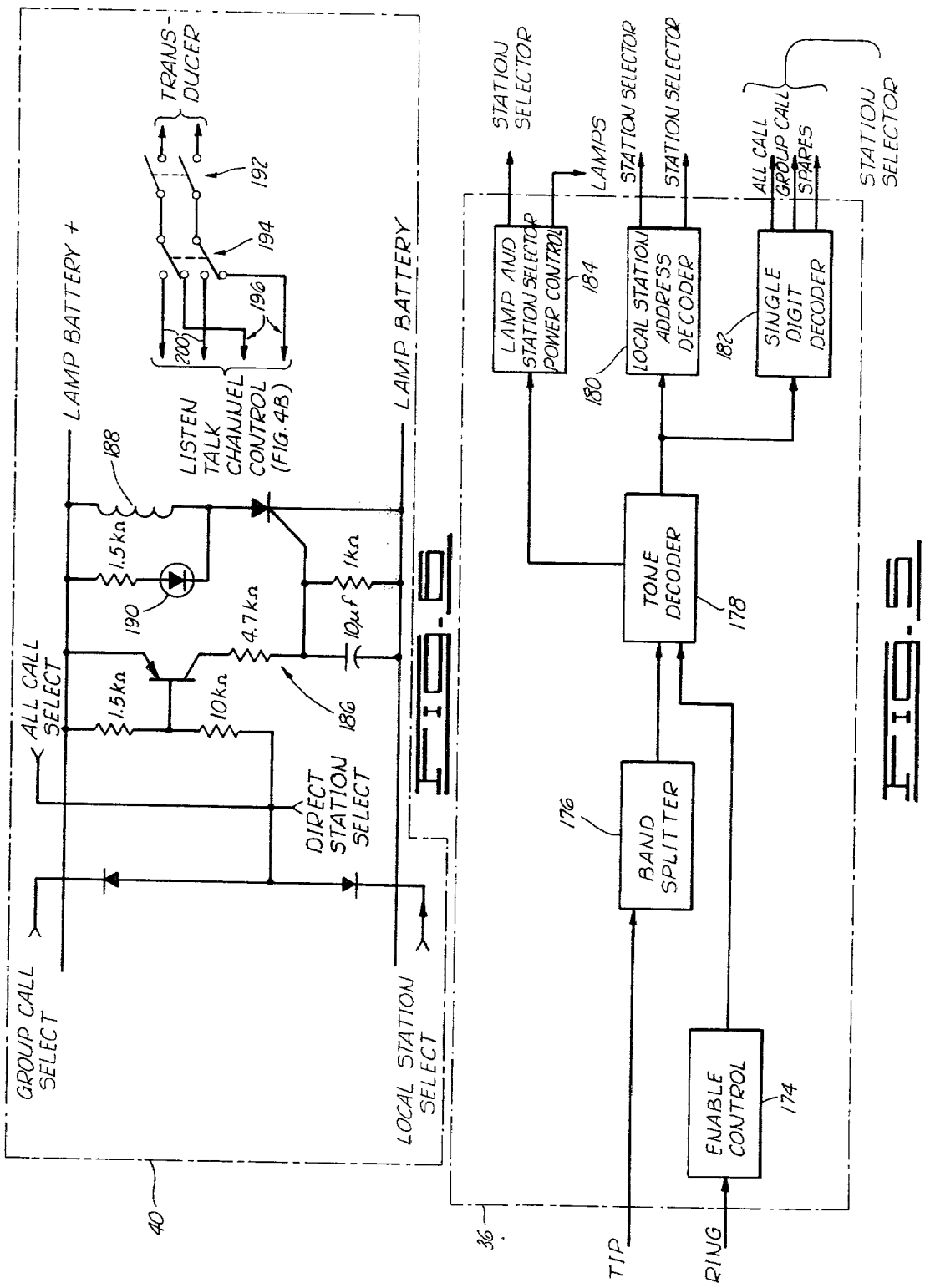

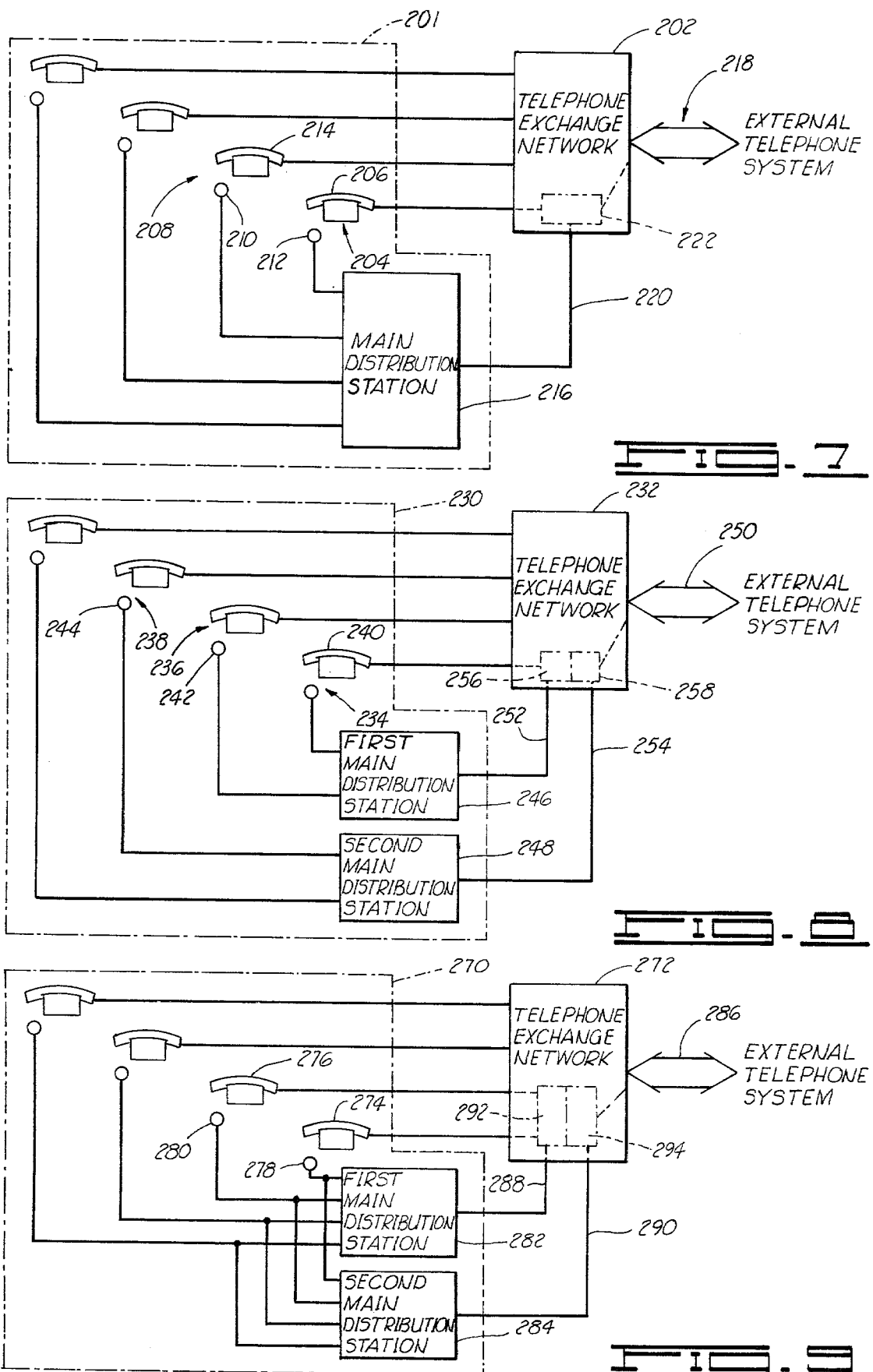

COMMUNICATION SYSTEM

RELATED APPLICATION

This application is a continuation-in-part of my co-pending United States patent application Ser. No. 73,075, filed on Sept. 6, 1979 entitled Hands-Free Talk-Back Intercommunications System.

BACKGROUND OF THE INVENTION

1. Field of the Invention

This invention relates generally to communication systems and more particularly, but not by way of limitation, to communication systems having an intercommunication (intercom) network and a telephone exchange network whereby two-way communication can be maintained between the calling station and the called station or stations via the telephone exchange network, such as a private automatic branch exchange.

2. Description of the Prior Art (Prior Art Statement)

The following statement is intended to be a prior art statement in compliance with the guidance and requirements of 37 C.F.R. §§1.56, 1.97 and 1.98.

Several intercom networks are known to be, or to have been, used. These networks are believed to be classifiable in one of two categories. The first category includes those systems having customized telephones which include special built-in electronic circuitry. The second category includes those types of systems which have large boxes or housings used in addition to the telephones with which such systems are used.

Regardless of the classification, however, these presently known types generally use unbalanced lines to interconnect the individual local stations with a central control unit. Also, each of these types uses various types of electronic switching circuits to perform the necessary functions of interconnecting the calling and called stations.

These systems generally indicate the need for some type of intercommunication network. More particularly, our present manner of living creates the need for intercommunication networks in such places as the home, business and hospital so that rapid communication may be spread to diverse and distant locations.

To satisfy such needs in an economically feasible manner, there is the further need to utilize ordinary telephones which are normally present in such places as the home, business and hospital. Furthermore, it is important that the intercom network be simple to install so that installation and service costs may be kept to a minimum. It is also important that the intercom network be compatible with private automatic branch exchanges (PABX) or similar telephone systems so that the intercommunication network may be integrated with the PABX or other type of telephone exchange network.

Although these needs are important, it is also important to provide an intercom network which provides relatively high quality audio so that the communications can be understood. Furthermore, there is the need that the network be versatile so that either individual or multiple stations may be addressed and also so that the communication can be broadcast in either a conversational level or a power amplification level. In such a versatile network wherein either an individual station or a plurality of stations may be called, it is important to provide the conversational level with separate output level controls so that one level can be used when the communication is between only the calling and a single called station, for example, and a separate level can be used when all of the stations are being addressed.

Still another need is to provide an intercommunication network which permits two-way conversation. To provide such a two-way network creates the further need for the system to have a talk channel and a listen channel which are interconnected to prevent lock up in either the listen or the talk modes. Furthermore, such interconnected channels raise the need for a built-in balance detector to test and set the balance for the least power feedback between the talk and listen channels. Another need in such a two-way network is the provision of apparatus for generating warning, or notification, signals to advise local stations that have been called that they are actively connected to a calling station.

In addition to these many needs, there is the need for apparatus within the intercommunication network whereby a central operator may directly select and communicate with any one or more of the various local stations.

Additionally, it is known that telephone exchange networks, such as private automatic branch exchanges, have been proposed or developed. Such proposals or developments indicate the need for private telephone exchanges. There is the further need of combining such telephone exchange networks with intercom networks to provide an overall communication system.

Although as previously stated, there have been various types of intercommunication networks and telephone exchange networks proposed, it is believed that each of such systems has the shortcoming of failing to meet, either individually or in combination, each and every one of the above-stated needs.

SUMMARY OF THE INVENTION

The present invention overcomes the above-noted and other shortcomings of the prior art by providing a novel, useful and improved communication system which combines telephone service with hands-free talk-back intercommunication service. Such a communication system as is hereinafter disclosed is readily adaptable for use in any of a number of places, but is of particular use in an environment capable of utilizing a private automatic branch exchange or the like.

The present invention utilizes ordinary telephones which do not need non-standard internal circuit modification as other types of systems need. The present invention utilizes these ordinary telephones by making simple installation connections to existing portions of the telephone. Furthermore, the connections between the telephones and the remainder of the present invention are made via twisted pair wires or other suitable lines to provide a balanced line for insuring relatively high quality audio communications.

The present invention is also versatile in that either individual or multiple stations may be called and either one of two conversational levels or a power amplification level may be broadcast. The particular conversational level is automatically selected by the present invention depending upon whether all or less than all of the stations are called. This is important because of the different output level requirements between communicating with either a single station or all of the stations in an "all call" situation, for example.

In addition to meeting these needs, the present invention also meets the need of providing a system wherein two-way communications may be effected. So that the system will not lock up in either the listen mode or the talk mode, the talk and listen channels of the present invention are interconnected so that the calling station always has control and thus can prevent a lock up. Furthermore, the present invention includes a built-in balance detector so that the balance between the interconnected channels can be checked and set for the least amount of power feedback. Additionally, since a local station may be called and listened in on due to the two-way communication feature of the present invention, the present invention includes apparatus for periodically sending warning, or notification, signals to each called station to notify that station that it is in active communication with another station.

Still further, the present invention includes apparatus whereby a central operator may directly select one or more of the local stations.

The intercom network of the present invention is also compatible with telephone exchange networks, such as a private automatic branch exchange. The combination of the intercom network with a telephone exchange network provides the inventive system which effects both internal and external telephone communications as is disclosed herein.

The basic configuration of the present invention generally includes an intercom network, and more particularly, a hands-free talk-back intercommunication network. This network includes a main distribution station, having a talk channel and a listen channel, and a plurality of local stations associated with the main distribution station. The present invention also includes a telephone exchange network, such as a private automatic branch exchange (PABX). Additionally, the system of the present invention may include a direct station selector which includes means for directly selecting one of the local stations so that the selected local station is in communication with the talk and listen channels of the communication system.

The plurality of local stations of the intercom network of the present invention includes a first local station which has a first telephone connected to the main distribution station. There is also a second local station which has a first transducer means and means for connecting the first transducer means in balanced electrical connection with the main distribution station to provide high quality audio signal transmission throughout the intercommunication network. With only these two local stations, only the first local station may call the second local station because the telephone is used as the calling instrument. Therefore, for the second local station to be able to call the first local station in the manner contemplated by the present invention, the second local station may include a second telephone and the first local station may include a second transducer means. This transducer means would likewise be connected to the main distribution station by a means for effecting a balanced electrical connection. More particularly, the balanced electrical connection may be by means of a single twisted pair of electrically conducting wires.

The main distribution station of the intercom network includes three main elements. The first element is a means which is connected to the telephone exchange network for monitoring the first telephone (and any other telephone within the network) to detect when it initiates a call to the second local station. The second element is a means for selecting the first transducer means in response to the monitoring means detecting the initiation of a call to the second local station by the first telephone. This selecting means not only selects, but also places the first transducer means in communication with the talk and listen channels of the main distribution station. The third element of the main distribution station is a means for controlling the communication on the talk and listen channels between the calling first telephone and the called first transducer means. As with the main distribution station, each of these elements includes a number of elements.

The call monitoring means of the main distribution station includes a means for enabling the monitoring means in response to a signal from the telephone exchange network as established by the first telephone. There is also a means for splitting the frequency bands of an address signal received from the telephone exchange network and a means for decoding the tones contained within the split frequency bands. Connected to the decoding means is a means for activating the transducer selecting means in response to the detection of one or more predetermined tones by the decoding means. Finally, the call monitoring means includes means for supplying electrical power to the transducer selecting means in response to the detection of an off-hook condition (i.e., the condition occurring when the telephone handset is lifted from the handset cradle).

The transducer selecting means of the main distribution station includes a first switch means and a second switch means. The first switch means is responsive to a signal from the call monitoring means whereas the second switch means is manually switchable.

The channel controlling means includes a means for providing an electrical interface between the talk channel and the listen channel and the telephone network. Associated with this interfacing means is a means for balancing the interface to adjust for minimum power feedback from the listen channel to the talk channel. Also included within the controlling means is a first talk amplifier means connected to the interfacing means. Connected to this amplifier means are a first means for setting a first level of loudness and a second means for setting a second level of loudness. Each of these first and second setting means is selectably connectable to the first talk amplifier means in response to a signal from the call monitoring means. Additionally, the controlling means includes a second talk amplifier means connected to the first and second level setting means for providing an output from the talk channel. Connected to this output is a means for switchably connecting the first transducer means to a respective one of either the output from the talk channel or an input to the listen channel. The input to the listen channel is provided by a means connected to the switchable connecting means for activating an electrical signal for testing the balancing means. Associated with this test activating means is a means for automatically controlling the gain of the listen channel. Finally, the channel controlling means includes a means connected to the interfacing means, to the activating means, and to the switchable connecting means for automatically controlling the switching by the switchable connecting means of the first transducer means to a respective one of either the output of the talk channel or the input of the listen channel.

To operate the intercom network, one who wishes to place a call on the system picks up the handset of the first telephone and dials or pushes the number specifying the address of the station to be called. The lifting of the handset and the addressing of the local station to be called are transferred through the telephone exchange network and detected by the call monitoring means. The call monitoring means decodes the address and activates the selecting means to select the local station which has been called. In the basic system of a single telephone and a single transducer means, this called station will be the second local station having the first transducer means. By so selecting the called station, the call monitoring means and the transducer selecting means place the transducer means located there in communication with the talk and listen channels contained within, and controlled by, the talk and listen channel controlling means.

When communication has been established, the channel controlling means places the system in the listen mode whereby the handset listens for any sounds detected by the first transducer means of the called local station. Should the person with the handset desire to communicate with a person located in the vicinity of the first transducer means, the person merely needs to talk into the handset. This generates a signal which is detected by the channel controlling means and causes the controlling means to switch from the listen mode to the talk mode. This switching to the talk mode will occur at normal voice levels if no signal is being concurrently detected by the listen channel, but it will occur only at higher magnitude voice levels if a signal is being concurrently detected by the listen channel. This difference results from the feature of the intercom network of the present invention which prevents lock up in either the talk or listen modes. Thus, in this manner two-way communication is established between the calling local station and the called local station. It is readily apparent that by having a telephone and a transducer means at each local station, any one local station can be used to place a call to any of the other local stations within the intercommunication network of the present invention.

As previously mentioned, this intercom network is combined with a telephone exchange network to create the telephone and intercom system of the present invention. The telephone exchange network of the present invention includes means for providing external telephone communications to the system of the present invention. The telephone network is connected to any of the telephones which are located at the local stations and are within the overall system of the present invention. The telephone exchange network is also connected to the main distribution station of the intercom network via an internal trunk. This permits linkage of the telephones to the transducers via the telephone network and the intercom network. In particular, the telephone network may include a private automatic branch exchange.

Therefore, from the foregoing, it is a general object of the present invention to provide a novel, useful and improved communication system for combining telephone service with intercom service. Other and further objects, features and advantages of the present invention will be readily apparent to those skilled in the art upon a reading of the description of the preferred embodiments which follows, when taken in conjunction with the accompanying drawings.

BRIEF DESCRIPTION OF THE DRAWINGS

FIG. 1 is a schematic illustration of the general elements of the hands-free talk-back intercommunication network of the present invention with the local station telephone connected directly to the main distribution station.

FIG. 2 is a more detailed schematic illustration of the intercom network of the present invention shown in FIG. 1.

FIG. 3 is a functional block diagram of the preferred embodiment listen/talk channel controlling means shown in FIG. 2.

FIG. 4A is a schematic diagram of a preferred embodiment electrical circuit implementing the line balance interface means, the first talk amplifier means, the dual level control and selector means and the second talk amplifier means of FIG. 3.

FIG. 4B is a schematic diagram of a preferred embodiment electrical circuit implementing the automatic gain control means, the balance test switch means and the voice-operated relay means shown in FIG. 3.

FIG. 4C is a schematic diagram of a preferred embodiment electrical circuit implementing the voice-operated relay control means shown in FIG. 3.

FIG. 4D is a schematic diagram of a preferred embodiment electrical circuit implementing the accessed station notifier means shown in FIG. 3.

FIG. 5 is a functional block diagram of the call monitoring means shown in FIG. 2.

FIG. 6 is a schematic diagram of a preferred embodiment electrical circuit implementing one of the local station selectors shown in FIG. 2.

FIG. 7 is a schematic illustration of a first preferred embodiment of the present invention showing the intercom network and the telephone exchange network combined.

FIG. 8 is a schematic illustration of a second preferred embodiment of the present invention showing the intercom network and the telephone exchange network combined.

FIG. 9 is a schematic illustration of a third preferred embodiment of the present invention showing the intercom network and the telephone exchange network combined.

DETAILED DESCRIPTION OF THE PREFERRED EMBODIMENT OF THE INVENTION

With reference now to the drawings and in particular to FIGS. 1 and 2, the preferred stand-alone embodiment of the hands-free talk-back intercom network of the present invention is shown. FIG. 1 discloses that the intercom network of the present invention includes a plurality of local stations denoted by the reference numerals 2 and 4 and identified, respectively, as "LOCAL STATION 1" and "LOCAL STATION 2". FIG. 1 illustrates that "LOCAL STATION 1" includes a telephone 6 having a handset 8. FIG. 1 also indicates that "LOCAL STATION 2" includes a first transducer means 10. This single telephone and single transducer means constitute the basic elements required at the local stations of the intercommunication network of the present invention. FIG. 1 also shows, however, that the local station with the telephone may also include a second transducer means 12 as shown located at "LOCAL STATION 1". Furthermore, a second telephone could be located at "LOCAL STATION 2".

FIG. 1 further shows that the elements within each of the local stations are connected, in this stand-alone embodiment, to a main distribution station 14. In FIG. 1 these connections are made via the twisted pairs of electrical conductors 16, 18 and 20 which provide balanced communication lines between the respective elements.

FIG. 1 also shows a direct station selector 22 connected to the main distribution station 14. The direct selector 22 includes means for directly selecting one of the local stations so that the selected local station is in communication with a talk channel and a listen channel contained within the intercom network as previously mentioned and as discussed further below.

The interconnections among the various elements of the preferred embodiment of the intercom network of the present invention are more particularly disclosed in FIG. 2. As with any ordinary telephone, the telephone 6 includes a tip and ring circuit to which is connected the handset 8. This tip and ring circuit is also connected via the electrical conductors 16 to a first pair of terminals 24 in the main distribution station 14. Also as in any ordinary telephone, the telephone 6 further includes a bell circuit to which is connected the second transducer means 12. The bell circuit is further connected to one pair of a plurality of second pairs of terminals 26 and 28 in the main distribution station 14 by means of electrical conductors 18. From the simple connections of the tip and ring circuit to the main distribution station and of the bell circuit to the transducer means and to the main distribution station, it is apparent that the present invention can easily utilize any ordinary, unmodified telephone for implementing the intercommunication system of the present invention. These simple connections also facilitate the installation and servicing of the present invention.

FIG. 2 also shows that the transducer means can be directly connected to a respective pair of the plurality of second pairs of terminals of the main distribution station 14. This is shown by the connection at terminal pair 28 between the first transducer means 10 and the main distribution station 14 by means of the electrical conductors 20.

FIG. 2 further shows that the direct station selector 22 is connected to the main distribution station 14 at a plurality of single terminals indicated by the reference numerals 30 and 32. The number of single terminals corresponds to the number of local stations which are contained within any particular embodiment of the present invention.

FIG. 2 also generally indicates the elements of the main distribution station 14 to which the previously mentioned terminals and electrical conductors are connected. FIG. 2 shows that the tip and ring circuit of the telephone 6 is connected via the electrical conductor 16 and the first pair of terminals 24 to listen/talk channel controlling means 34 and to a call monitoring means 36. The transducer means are shown to be connected via their respective electrical conductors and second pairs of terminals to elements within a station selecting means 38. In particular, each respective pair of conductors from the local station transducer means is connected to a respective local station selector which is contained within the station selector 38. FIG. 2 specifically shows that the second transducer means 12 is connected to a local station 1 selector means 40 and that the first transducer means 10 is connected to a local station 2 selector means 42.

FIG. 2 further discloses a series of specific connections between the various elements within the main distribution station 14. These connections include a pair of conversational communication lines 44 extending between the channel controlling means 34 and each of the local station selectors within the station selecting means 38. Also extending between the means 34 and 36 is a pair of power amplification communication lines 46. Interconnecting the call monitoring means 36 with the channel controlling means 34 is an enable conductor 48. Interconnecting the call monitoring means 36 with the local station selectors of the station selecting means 28 is an "all call" line 50, a "group call" line 52, and a station power line 54. Each of these three lines is common to all or a group of the local station selectors. Further connecting the call monitoring means 36 with the station selecting means 38 is a first address line 56 extending between the call monitoring means 36 and the local station 1 selector means 40. Extending between the call monitor means 36 and the local station 2 selector means 42 is a second address line 58. FIG. 2 finally discloses that the direct station selector means 22 provides its own individual address lines 60 and 62 extending to respective ones of the local station selectors within the station selecting means 38.

With reference now to FIGS. 3 and 4A–4D, a more detailed description of the listen/talk channel controlling means 34 will be described. Generally, the channel controlling means 34 is a means for controlling the communications over the talk and listen channels between the telephone of the calling local station and the transducer means of the called local station. More particularly, FIG. 3 shows that this control is provided by means which are interconnected to form the previously mentioned talk channel and listen channel.

These means include a first means for providing an interface identified in FIG. 3 as a line balance and interface means 64 which is shown connected to the tip and ring circuit interconnecting the telephones (if more than one is used in a particular system configuration) of the various local stations. Connected to the line balance and interface means 64 is the talk channel which includes a first talk amplifier means 66, a dual level control and selector means 68, and a second talk amplifier means 70. The input to the first talk amplifier means 66 from the line balance and interface means 64 is defined as a first input of the talk channel, and the output from the second talk amplifier means 70 is defined as a first output of the talk channel.

This first output of the talk channel is connected to a second means for providing an interface disposed between the station selecting means 38 and the talk and listen channels of the channel controlling means 34. This second interfacing means is particularly disclosed to be a voice-operated relay means 72. Extending from this second interfacing means is the listen channel which specifically has its input connected to the voice-operated relay 72 as shown in FIG. 3. This input connects to a balance test switch means 74 and also to an automatic gain control means 76. The output from the automatic gain control means 76 defines an output of the listen channel and is connected to the line balance and first interface means 64.

In addition to these elements which define the interface means and the talk and listen channels, the channel controlling means 34 is shown in FIG. 3 to include a means for automatically controlling the second interface means' function of connecting selected stations to a respective one of either the talk channel or listen channel. More particularly, FIG. 3 shows that this automatic controlling means is a voice-operated relay control means 78 connected to the balance test switch means 74, to the line balance and first interface means 64, and to the voice-operated relay means 72. In the basic configuration of a system having a single telephone and a single transducer means, the voice-operated relay control means 78 automatically controls the switching by the voice-operated relay means 72 of the first transducer means to a respective one of either the output of the talk channel or the input of the listen channel.

One further element of the channel controlling means 34 which is connected to the line balance and interface means 64 is an accessed station notifier means 80 which provides a periodic warning signal to any of the local stations which have been addressed and which could otherwise be unknowingly listened in on by the calling local station.

With reference now to FIGS. 4A–4D, these figures more particularly define the elements of the channel controlling means 34 by disclosing a preferred embodiment electrical circuit for implementing the FIG. 3 means. In preface to the circuit description it is to be noted that throughout FIGS. 4A–4D there are disclosed a power system which includes the B+ power bus, a first ground system indicated by the triangle symbol, a second ground system indicated by three parallel horizontal lines, and a virtual ground system indicated by the symbol VG which is at a voltage intermediate the B+ and the first and second ground voltages. In a typical system, for example, the B+ line may be at 0 voltage, the first ground at $-24$ volts, and the second ground at $-15$ volts. The virtual ground line is then intermediate these at a level such as $-7.5$ volts. It is also to be noted that, as with the previously mentioned specific voltages, the component values listed in the figures are merely included for purposes of fully disclosing the best mode preferred embodiment of the present invention and are not to be taken as in any way limiting the ranges of values which may be used to implement the present invention.

FIG. 4A discloses a preferred embodiment electrical circuit for the line balance and first interface means 64, the first talk amplifier means 66, the dual level control and selector means 68 and the second talk amplifier means 70.

The line balance and first interface means 64 generally includes means for providing an electrical interface between the talk channel and the listen channel and the tip and ring circuit of the telephones contained within the system, such as the first telephone 6. The balancing means may be variably controlled so that the electrical balance of the interface can be adjusted to provide a minimum of feedback to be coupled from the listen channel into the talk channel.

The balance and interface means more particularly includes a first resistor network 81 having a first resistor 82, a second resistor 84 and a first variable resistor 86. These three resistors are shown to be connected in series between the tip and ring lines of the telephones of the local stations. This series of resistors is connected to these lines through respective capacitors 88 and 90. It will be noted that the variable resistor 86 permits adjustable control for variably setting the balance of the interface.

The balance and interface means further includes a capacitor 92 which couples the output of the listen channel to the resistor network 81. Also included are capacitors 94 and 95 and a drive amplifier circuit including a second resistor network 96 and an operational amplifier 98, interconnected as known in the art for coupling the talk channel input to the balance and interface means. The output of the operational amplifier 98 provides the audio signal which is coupled through a capacitor 100 to the input of the talk channel at the first talk amplifier means 66.

The first talk amplifier means 66 includes an operational amplifier 102 to which are connected a first resistor-capacitor network 104, a resistor 106 and the virtual ground as is known by those skilled in the art. The output from the operational amplifier 102 is connected to the dual level control and selector means 68. The output may also be connected to a power amplifier for providing a greater amplified audio signal than is provided by the second talk amplifier 70. The use of such a power amplifier in conjunction with the second talk amplifier means 70 provides the present invention with the feature of having the capability of both conversational levels of output and also higher power amplifier levels.

The means 68 includes a first means for setting a first level of loudness and a second means for setting a second level of loudness, each of which is controllable in response to a signal from a means for automatically selecting one of the two loudness levels. Each of the level setting means includes a respective one of the two variable resistors 108 and 110. Each of these resistors is individually controllable to set different levels of gain in the talk channel. The automatic selecting means includes a NAND network 112 connected as is known in the art to provide a latch, and also includes two electronic switches 114 and 116. The switch control input of the switch 114 is connected to one output from the NAND latch 112, and the switch control input of the other switch 116 is connected to the other output from the latch 112. Thus, either one or the other of the switches 114 and 116 is "on" when the other is "off". In other words, the audio signal from the first amplifier means 66 passes through either the switch 114 or the switch 116, but not both, depending upon the outputs of the latch 112.

Therefore, under control of the latch 112 either one or the other of the two separate gain levels may be selected. For example, when the reset input of the latch 112 is activated to reset the latch, the switch 116 will be activated to connect the audio signal from the first talk amplifier means 66 to the gain level setting means of the resistor 110. In this situation the resistor 110 may be set to provide a normal conversational level of gain for use when only a single local station is called by another local station. On the other hand, when all of the stations are called, the other latch 112 input, labeled "ALL CALL-NO TALK BACK SELECT" in FIG. 4A, is activated which in turn activates the switch 114 to interconnect the audio signal from the first talk amplifier means 66 to the gain level setting means of the variable resistor 108. Thus, in this situation the gain may be set at a different level so that all of the local stations may be spoken to in a level other than the normal single station conversational level. Regardless of which gain level is selected, though, the output from the dual level control and selector means 68 is connected to the input of the second talk amplifier means 70.

The second talk amplifier means 70 amplifies the received signal through a low power amplifier 118 such as an LM380 audio power amplifier. To this amplifier are connected various circuit components, as shown in FIG. 4A and as is known in the art, so that approximately two watts of power are provided by the amplifier 118. The output from the amplifier 118 is coupled through a capacitor 120 to the voice-operated relay means 72 which is shown in FIG. 4B.

The voice-operated relay means 72 is a means for switchably connecting the transducer means located at the addressed local stations to a respective one of the output from the talk channel and the input of the listen channel. In general, this can be a switch means having a first pair of first terminals connected to each of the transducer means, a second terminal connected to the output of the talk channel, a third terminal connected to the input of the listen channel, and a pair of switch elements associated with the first pair of terminals for selectively switching the pair of first terminals into electrical connection with a respective one of the second terminal and the third terminal. Such a switch means may also include a second pair of first terminals connected to the transducer means for connecting the transducer means to the output of the power amplifier which may be used with the present invention as discussed above with respect to the first talk amplifier 66. The connections between the first and second pairs of first terminals and the transducer means are illustrated in FIG. 2 by the pairs of lines 44 and 46.

This general configuration is more particularly defined by a specific embodiment relay shown in FIG. 4B. The relay includes an activating coil 122 which is associated with the switch elements 124. When no current is passing through the coil 122, the switch elements 124 are in their positions as shown in FIG. 4B to thereby provide a connection between the input of the listen channel and the transducer means selected by the station selecting means 38. On the other hand, when current is passing through the coil 122, switch elements 124 switch from their upper positions shown in FIG. 4B to their lower positions against the respective lower contacts of the contact pairs shown in FIG. 4B. In this activated state the relay switch elements 124 connect the selected transducer means to either the normally amplified audio signal from the second talk amplifier means 70 or to the higher power amplifier signal as previously mentioned. Controlling the flow of current through the coil 122, and thus controlling the switching of the switch elements 124, is a transistor 126 used as a switch under the control of the voice-operated relay control means 78.

As previously mentioned, when the relay is in its unactivated state, the switch elements 124 connect the transducer means of the called local stations to the listen channel to thereby permit the calling station to listen to any sounds emanating from the called local station or stations. When such sounds are present and detected, they are transmitted through the unactivated relay to the balance test switch means 74 and to the automatic gain control means 76.

FIG. 4B shows that the balance test switch means 74 includes a switch means 128 which may be manually operated. When the switch 128 is in its open position as shown in FIG. 4B, the detected sound signal is applied to the inputs of an operational amplifier 130 through respective ones of a resistor 132 and a resistor 134. When the switch 128 is closed, the circuit components of the balanced test switch means 74 are interconnected to generate an oscillating signal as is known by those having ordinary skill in the art. Thus, by closing the switch 128, a test signal can be generated and applied to the remainder of the circuit as subsequently described to check and set the balance of the balance and interface means 64.

In addition to being connected to the balance test switch means 74, the detected sound signal is connected to the automatic gain control means 76. FIG. 4B shows that the connection is made through an electronic switch means 136. When the present invention is in the listen mode of operation, the electronic switch 136 is closed to permit the passage of the detected sound signal to the gain control elements. These gain control elements include the various resistors, capacitors, diodes and operational amplifiers shown in FIG. 4B and which are connected as shown therein and as is known by those skilled in the art. In particular, there is a variable resistor 138 which can be adjusted to set the initial level of gain. The output from the automatic gain control means 76 is connected to the balance and interface means 64 as shown in FIG. 4A. When the present invention is in the overriding talk or muted modes of operation as subsequently described, the switch means 136 is opened to prevent the transmission of the detected sound signal to the gain control elements and on to the calling station.

Referring now to FIG. 4C, there is shown a schematic illustration of the preferred embodiment of the voice-operated relay control means 78. This portion of the present invention includes a means 140 for detecting the presence of an audio signal in the listen channel circuit. It also includes a means 142 for detecting the presence of an audio signal and for amplifying such audio signal which is present in the talk channel circuit. Further included in the relay control 78 is a means 144 for indicating the relative magnitude of the signal detected to be present in the talk channel. Also included in the relay control means 78 is a means 146 for providing an inhibit signal to inhibit the talk back operation of the present invention. The relay control means 78 further includes a means 148 for muting the control circuit when two or more telephone handsets within the system have been lifted from their cradles.

The means 140 for detecting the presence of an audio signal in the listen channel is shown in FIG. 4C to include a plurality of operational amplifiers interconnected with a plurality of resistors and capacitors as is known in the art to provide an output signal indicating the presence of a listen channel signal to a NAND gate 150. This output signal also illuminates a light emitting diode 152 to visually indicate the presence of a listen channel signal.

When the means 140 detects the presence of a signal, this causes the gate 150 to provide a switch control signal to the detecting and amplifying means 142.

FIG. 4C discloses that the detecting and amplifying means 142 includes a switch means 152 interconnected with a resistor 154 and a resistor 156. It is the switch 152 which is controlled by the switch control signal provided by the gate 150. FIG. 4C further shows that the means 142 includes a plurality of operational amplifiers interconnected with a plurality of resistor and capacitor elements as is known in the art to provide a talk channel signal detection signal to a NAND gate 158. This detection signal is also applied to a light emitting diode 160 which is illuminated whenever a talk channel signal has been detected. The gate 158 provides a relay control signal which is connected to the transistor 126 shown in FIG. 4B. Thus, when a signal has been detected in the talk channel and is so indicated by the output of the gate 158, the transistor 126 switches "on" to energize the relay coil 122 to thereby switch the elements 124 to connect the talk channel to the called local station transducer means.

The switch means 152 and the resistors 154 and 156 operate under the control of the listen channel signal detection signal means 140 to provide a means for amplifying a talk channel audio signal by a respective one of two predetermined channel control gain levels. The predetermined gain levels are established by the values of the resistors 154 and 156. That is, when no signal is detected in the listen channel, the switch 152 is closed due to the high logic output from the gate 150 to create a parallel connection between the resistors 154 and 156. This establishes a maximum gain condition for the first operational amplifier in the means 142 circuit. This maximum gain condition permits a normal conversational voice level at the calling station to be detected and thus to switch the transistor 126 "on" to thereby connect the talk channel to the transducer means at the called station.

On the other hand, when a listen channel signal is detected, the means 140 drives the gate 150 to a low logic output to open the switch 152 thereby causing only the resistor 154 to be in the gain determination circuit of the first operational amplifier. This switching of effective resistance values provides a lower amount of gain within the means 142 circuit. Thus these elements create a means for automatically preselecting one of the plurality of predetermined gain levels in response to the detecting means 140. As a result of this automatic selection, when a signal has been detected in the listen channel, the signal in the talk channel must have a greater magnitude to cause the talk channel signal detection signal to be generated to activate the voice-operated relay as just described. In other words, when the person at the calling station wishes to speak to one at the called station and there is concurrently a sound at the called station which is detected by the transducer means located there, the person at the calling station must speak louder than normally to overcome the lower gain resulting from the action of the switch 152 in response to the detected listen channel sound. If the caller does speak loudly enough the talk channel overrides the listen channel. This operation of the relay control means 78 prevents lock-up in either the listen or talk modes. Thus, the relay control means 78 provides a means for actuating the voice-operated relay means 72 during a period when a listen channel signal is present. This actuating occurs in response to the detection of a talk channel audio signal which exceeds a predetermined magnitude as determined by the resistor 154 in conjunction with the first operational amplifier in the detection and amplifying means 142.

The means 140 and 142 provide the basic functions of the voice-operated relay control means 78; however, these two means also work in conjunction with the indicating means 144 during the period when the switch 128 of the balance test switch means 74 is closed or, in other words, when a test signal has been applied to the circuit to test and adjust the balance of the balance and interface means 64. When the test condition is present, a light-emitting diode 162 is illuminated to an intensity which is dependent upon the magnitude of the test signal which has been coupled from the listen channel into the talk channel. Thus, by adjusting the variable resistor 86 in the line balance and interface means 64 to obtain a minimum brilliance emitted by the diode 162, the optimum balance point providing minimum feedback can be obtained.

FIG. 4C further indicates that the control means 78 includes a latch means 146 which provides a control signal to indicate when a "no talk back condition" is desired. When this condition is desired, the latch inhibits the operation of the amplifying and detecting means 142 thereby prohibiting the switching of the voice-operated relay means 72 to the talk channel. In this mode the local station transducer means are always connected to the listen channel.

FIG. 4C still further discloses a muting means 148 which includes an operational amplifier interconnected with a plurality of resistors and a capacitor as is known in the art. This means 148 detects when two or more handsets are actively on the tip and ring circuit and provides a mute control signal to inhibit the entire voice-operated relay control means 78 during such condition. This permits handset-to-handset communication and inhibits handset-to-transducer means communication.

In addition to providing the basic function of controlling the talk and listen channel interaction, the channel controlling means 34 provides an access station notifier means 80 having a preferred embodiment circuit diagram as shown in FIG. 4D. This notifier means 80 provides a means for periodically providing a notification signal to the transducer means of those local stations which have been addressed and are in communication with the tip and ring circuit through the talk and listen channels of the channel controlling means 34.

FIG. 4D shows that the notifier means 80 is opto-electrically connected to the station selecting means 38 and a lamp battery by means of an opto-electrical connector means 164. When this opto-electrical means 164 is activated, it drives a first timer means 166, which is connected in a fashion known in the art to a plurality of resistors and capacitors, to provide a timed output. In the preferred embodiment of the present invention, for example, this timed output is generated approximately once every fifteen seconds. This generated signal is passed through a plurality of gate means 168 to activate a tone generator 170 associated with the indicated resistors and capacitors to define the frequency of the tone signal. The station alerting tone signal generated by the tone generator 170 is connected to the line balance and interface means 64 as indicated in FIG. 4A.

In addition to the 15-second timer 166, the present invention includes a second timer means 172 which is activated when an "all call-no talk back" situation (i.e., either all stations are being called or the talk channel has been inhibited) is encountered. When such a condition is encountered, the timer 172 also generates a timing signal which activates the tone generator 170 in complement of the first timer 166 to thereby cause a double warning signal to be sent to the addressed transducer means. Thus, by having both a single warning signal (timer 166 operating alone) and a double warning signal (timer 172 complementing timer 166), the present invention permits a person at the called local station to known whether the transducer means located there is actively connected to a calling station in a normal call situation or an "all call-no talk back" situation, respectively.

With reference now to FIG. 5, the funtional block diagram of the elements of the call monitoring means 36 will be described. This call monitoring means 36 is a means which is connected to the tip and ring circuit for detecting when a call has been placed by one of the telephones in one of the local stations addressing one of the transducer means of the local stations. In the basic system of a single telephone and a single transducer means, the monitoring means is connected to the telephone of the first local station for monitoring when the telephone initiates a call to the transducer means of the second local station.

FIG. 5 discloses that the call monitoring means 36 includes an enable control means 174 connected to the ring line for enabling the monitoring means 36 in response to a signal from the calling telephone on the ring line. Connected to the tip line and to the output of the enable control is a band splitter means 176 which is a means for splitting the frequency bands contained within an address signal sent along the tip and ring circuit from the calling telephone by means of its dialing mechanism. The output from the band splitter is connected to a tone decoder 178 which is a means for decoding the tones contained within each of the split frequency bands. The output of the tone decoder 178 is connected to a local station address decoder means 180 and to a single digit decoder means 182 which provide means for activating the individually or collectively addressed transducer means located in the appropriately addressed local stations. The tone decoder 178 also provides an output to activate a lamp and station selector power control means 184 which, when activated, supplies power to the station selecting means 38 and to lamps located at each of the telephones within the system.

Applicant believes that circuit embodiments of each of the individual elements within the call monitoring means 36 are individually known by those skilled in the art, and thus no detailed circuit analysis of the elements will be made.

With reference now to FIG. 6, the preferred embodiment circuit diagram of the local station selector 40 within the station selecting means 38 will be described. It is to be noted that each of the local station selectors includes a similar type of circuitry. FIG. 6 shows that the local station selector 40 includes a plurality of inputs of which are connected the address select lines. These lines include "group call select", "all call select", "local station select" and "direct station select". The "group call select" and "all call select" lines address the station in response to signals from the single digit decoder means 182 shown in FIG. 5. FIG. 2 indicates these address lines as the "all call" line 50 and the "group call" line 52. The "local station select" line addresses the station in response to a signal from a respective one of the lines extending from the local station address decoder means 180 shown in FIG. 5. With respect to the local station selector 40, FIG. 2 indicates this to be the first address line 56. The "direct station select" line addresses the station in response to a direct call from the direct station selector 22 shown in FIG. 2. With respect to the local station selector 40, FIG. 2 indicates this call would be via line 60.

These inputs from these lines are connected to a switching circuit which includes a resistor-capacitor network, a transistor, and a silicon controlled rectifier generally indicated by the reference numeral 186. This switching networm controls the energization of a relay coil 188 and its accompanying light-emitting diode 190 which is illuminated when the coil is activated. The relay which includes the coil 188 also includes a pair of switch elements 192 which are connected to a transducer means at a respective one of the local stations and which are normally open (as shown in FIG. 6) when the coil 188 is unactivated. In this open position the transducer means to which the relay is connected is not in communication with the talk and listen channels of the channel controlling means 34. When the switching network 186 is activated in response to being addressed over one of the address lines to energize the relay coil 188, the switch elements 192 are closed to connect the transducer means to the channel controlling means 34. If the controlling means 34 is in the listen mode (i.e., the calling station is not causing the talk channel to override the listen channel), the transducer means is in communication with the listen channel by means of the switch elements 192 being closed and a manual switch means 194, and the switch elements 124 of the relay 72 being in the position shown in FIG. 4B. If the controlling means 34 is in the talk mode, the transducer means is connected either to the conversational level power amplifier 118 shown in FIG. 4A or to the high power amplifier previously mentioned as being capable of incorporation with the present invention. The particular connection depends upon the setting of the manual switch means 194. With the switch means 194 set as shown in FIG. 6 and the switch elements 192 closed, the transducer means would be connected to the amplifier 118 via conductors 196 in FIG. 6 and conductors 198 in FIG. 4B. With the switch means 194 switched to its alternate position, the transducer means would be connected to the optional amplifier via conductors 200 in FIG. 6 and conductors 202 in FIG. 4B.

Thus FIG. 6 shows that the station selecting means 38 includes a plurality of means for selectively connecting the appropriately addressed local station or stations to the talk and listen channels in response to address signals from the call monitoring means 36 via the several input lines to each local station selector. More particularly, each local station selector includes a first switch means which is responsive to such an address signal from the call monitoring means and also includes a second switch means which is manually switchable between either the conversational level power amplifier disclosed in FIG. 4A or with the power amplifier indicated in FIG. 4B.

With general reference to FIGS. 1-6, the operation of the preferred embodiment of the intercom network of the present invention, as a stand-alone unit (i.e., not integrated with the telephone exchange network), will now be described with reference to a system having a plurality of telephones and transducer means. When one wants to use the network to address one or more of the transducer means contained within the network, that person lifts the handset of any one of the telephones which is within the network. This generates on the tip and ring circuit a signal which is detected by the call monitoring means 36. This illuminates the lamps disclosed in FIG. 5 to indicate to all telephones within the network that the network is in use.

Next, the user punches in either a one- or two-digit address to indicate the one or more local stations to be called. If a single digit is punched, the single digit decoder means 182 determines whether either a "group call" or an "all call" is being made to a collection of some or all of the local stations. If a two-digit address is punched, then the local station address decoder means 180 determines the individual station called and causes the particular relay coil 188 and switch element 192 of the called station to close thereby connecting the transducer of the addressed local station with the talk and listen channels of the system. It is to be noted that when a local station is connected in active communication with the system, it is maintained in such active communication until the calling station hangs up the handset. Thus, a plurality of individual stations can be called in any sequence thereby providing a conference call capability to the system.

Once a local station has been addressed and connected to the listen/talk channel controlling means 34, any sound which is detected by the transducer means located at the addressed local station is transmitted to the calling telephone. This is accomplished by means of the switch elements 124 shown in FIG. 4B being initially in their listen mode. When the system detects the presence of a signal in its listen channel, the voice-operated relay control means 78 operates to reduce the gain in the amplifying and detecting means 142.

In particular, in the preferred embodiment shown in FIG. 4C, when a sound is detected in the listen channel, the switch means 152 is opened to disconnect the parallel combination of the resistors 154 and 156. In the particular FIG. 4C embodiment this reduces the gain by a factor of approximately 0.67. Thus, as previously described, for a caller at the calling station to talk to a person at the transducer means, the caller must speak louder than when the gain is higher to overcome the reduced gain of the voice-operated relay control means 78. However, when the caller does speak loudly enough, the amplifying and detecting means 142 provides a signal to the gate 158 which causes the transistor 126 shown in FIG. 4B to conduct to thereby activate the coil 122. The activation of the coil 122 causes the switch elements 124 to switch and connect the transducer means to the talk channel of the channel controlling means 34. The caller may then broadcast through the addressed transducer means. It is to be noted that when there is no sound signal detected by the listen channel, there is no reduced gain in the voice-operated relay control means 78 so that a normal voice level will cause the talk channel to override, the listen channel to permit the caller to broadcast over the accessed transducer means.

When the transducer means is connected to the talk channel, it is shown in FIG. 4D that either the normal conversational power amplifier 118 shown in FIG. 4A is connected to the transducer means or a higher power amplifier, which may be connected between the first talk amplifier 66 shown in FIG. 4A and the relay switch means 124 shown in FIG. 4B, is connected to the transducer means. The particular one of the two possible audio signals which can be output from these amplifiers through the transducer means is selected by manually switching the switch means 194 shown in FIG. 6 as previously discussed.

In addition to providing this two-way communication in either a conversational level or a higher power amplified level, the present invention can inhibit the talk back capability. This may be done by activating the latch 146 shown in FIG. 4C. This inhibiting capability is also accomplished by means of the mute control 148 when two or more handsets are removed from their cradles as previously discussed.

Still another feature of the intercom network is the providing of a warning signal to all accessed transducer means. This is shown in FIG. 4D to occur when a coil 188 in a local station selector, as shown in FIG. 6, has been activated. This occurrence causes the activation of the opto-electrical means 164. This in turn causes the generation of a periodically generated tone that is applied to the talk channel of the listen/talk channel control means 34 for transmission to any transducer means which is actively connected to the channel controlling means 34. Also as previously mentioned, a second tone is generated to signify an "all call" or "no talk back" condition in the system.

One further feature to be noted is that during the operation of the talk mode, the communication over the conversational power amplifier lines can be further modified by either one of two separate level controls as indicated in FIG. 4A. In particular, when less than all of the stations are being called and when there is not a "no talk back" condition, then one level is selected by means of the dual level control and selector means 68. When an "all call" condition or a "no talk back" condition does exist, however, then a second level is selected. This feature is desirable to permit individual control of both the private conversational level and the public "all call" level.

Referring now to FIG. 7, a system for combining telephone service with the previously described hands-free talk-back intercommunication network will be described. The figure shows that the telephone and intercom system includes an intercom network 201 combined with a telephone exchange network 202.

The intercom network 201 includes a first local station 204 having a first telephone 206 located thereat. The intercom network 201 also includes a second local station 208 having a first transducer means 210. FIG. 7 shows that the first local station 204 may also include a second transducer means 212 and the second local station 208 may also include a second telephone 214. Also shown in FIG. 7 are additional local stations which may have their own respective transducer means and telephones.

FIG. 7 further shows that the intercom network 201 includes a main distribution station 216 which is associated with both the first and second local stations 204 and 208. The main distribution station 216 is of the type as previously described and thus has a first means for establishing a talk channel and a listen channel.

Within the intercom network 201, the elements of the main distribution station are as previously described with respect to the network shown in FIGS. 1–6. However, instead of being directly connected to the telephones located at the respective local stations, the channel controlling means 34 and the call monitoring means 36 are connected to a first internal trunk 220. In particular, this connection is made by connecting the electrical conductors 16 shown in FIG. 2 to the first internal trunk 220.

The telephone exchange network 202 is shown in FIG. 7 to include an outside trunk 218 which connects to an external telephone network for providing external telephone communications to the system of the present invention. The telephone exchange network also includes the first internal trunk 220 which extends from the network 202 for connection to the first talk channel and listen channel establishing means of the main distribution station 216. FIG. 7 further shows that the telephone exchange network includes first means 222 for switchably electrically connecting to the first internal trunk 220 the respective tip and ring circuit which is within each of the telephones located at the local stations. The first means 222 is responsive to a first predetermined signal transmitted by a first one of the telephones so that when the signal is received, the means 222 effects the electrical connection to the first internal trunk. Alternatively, the means 222 may connect the telephone to the external telephone system via the outside trunk if an appropriate predetermined signal is detected by the means 222. The means 222 may be any appropriate call switching apparatus known to those having ordinary skill in the art.

In operation, the system is utilized by lifting one of the handsets of the telephones and initiating a call therefrom. For example, if the digit "1" is dialed on one of the telephones, the means 222 will connect that telephone to the first internal trunk 220 if the digit "1" is set as the first predetermined signal previously mentioned. Likewise if the digit "9" is dialed on the telephone, the means 222 will connect that telephone to the outside trunk 218 for communication with the external telephone system if the digit "9" is the appropriate predetermined signal to make the means 222 so respond. It is apparent that the means 222 may be so constructed to appropriately respond to any single digit or combination of digits so that the calls are transferred to the respective locations.

When a call is placed and connected to the first internal trunk 220, the call will be connected to the appropriate transducer means as previously discussed in the description of the hands-free talk-back intercom network. Likewise, when the call is connected to the outside trunk 218, the call will be further transferred through the external telephone system as is known by those having ordinary skill in the art.

It is to be noted that the FIG. 7 embodiment is for use at locations where the telephone-transducer means traffic is relatively light because only a single telephone may be addressing one or more of the transducer means at any one time. This results from the single internal trunk and single main distribution station in the FIG. 7 configuration.

With reference now to FIG. 8 a second preferred embodiment of the combined intercom and telephone system will be described. This embodiment includes an intercom network 230 and a telephone exchange network 232. The intercom network 230 includes a first local station 234, a second local station 236 and a third local station 238. The first local station 234 includes a first telephone 240. The second local station 236 includes a first transducer means 242, and the third local station 238 includes a second transducer means 244. FIG. 8 also indicates that the intercom network 230 may include additional local stations and additional telephones and transducer means.

The intercom network 230 also includes a first main distribution station 246 and a second main distribution station 248. The first main distribution station 246 is associated with the second local station 236, and the first main distribution station 246 has a first means for establishing a talk channel and a listen channel. The second main distribution station 248 is associated with the third local station 238 and has a second means for establishing a talk channel and a listen channel.

The telephone exchange network 232 includes an outside trunk 250 for providing external telephone communications to the system of the present invention. The telephone exchange network also includes a first internal trunk 252 and a second internal trunk 254. The first internal trunk 252 is connected to the first talk and listen channel establishing means of the first main distribution station 246, whereas the second internal trunk 254 is connected to the second talk channel and listen channel establishing means of the second main distribution station 248. The telephone exchange network 232 further includes a first means 256, responsive to a first predetermined signal transmitted by the first telephone 240 (or any of the other telephones which may be within the system), for switchably electrically connecting the tip and ring circuit of the signaling telephone to the first internal trunk 252. The telephone network also includes a second means 258, responsive to a second predetermined signal transmitted from the first telephone (or, again, from any of the telephones within the network), for switchably electrically connecting the tip and ring circuit of the signaling telephone to the second internal trunk 254.

Each of the components within the preferred embodiment shown in FIG. 8 includes elements similar to those described with respect to the embodiment shown in FIG. 7 and with respect to the embodiment shown in FIGS. 1-6.

Operationally, the second embodiment shown in FIG. 8 is similar to that shown in FIG. 7. However, in the FIG. 8 embodiment when the telephone 240 is used to address the first transducer means 242, it sends the first predetermined signal which causes the first means 256 to connect the telephone 240 to the first main distribution station 246 via the first internal trunk 252. If the telephone 240 is to address the second transducer means 244, it transmits the second predetermined signal to cause the second means 258 to connect the telephone 240 to that transducer means via the second internal trunk 254 and the second main distribution station 248. If the telephone 240 is to be connected to the external telephone system, it transmits a third predetermined signal which causes the means 256 and 258 to switch the telephone 240 to the outside trunk 250.

More particularly, the FIG. 8 embodiment may be used where different groups of stations need to be called. This is accomplished by having two or more transducer means connected to each of the first and second main distribution stations. Thus, when a call is placed over one of the telephones and is connected to the first internal trunk 252, that call will be placed to all of transducer means connected to the first main distribution station 246. These transducer means may, for example, be the administration section of the business in which the inventive system is used. Similarly, a number of transducer means may be connected to the second main distribution station 248 for connection to the calling telephone when that telephone transmits the second predetermined signal for connection to the second internal trunk 254. When this signal is transmitted, all of the transducer means connected to the second main distribution staton 248 may be called. Each of these stations may, for example, be the sales offices within the business using the inventive system.

This embodiment may also be operated so that less than all of the transducer means connected to each main distribution station may be addressed. To accomplish this, the first or second predetermined signal would be transmitted so that the calling telephone would be connected to the respective one of the internal trunks, and then an additional address signal would be transmitted to cause the respective main distribution station to activate one or more of the transducer means connected thereto.

With reference now to FIG. 9, the third preferred embodiment of the intercom and telephone system of the present invention will be described. As will be noted from an examinatin of FIG. 9, it contains essentially the same elements as the FIG. 8 embodiment. That is, there is an intercom network 270 and a telephone exchange network 272.

Contained within the intercom network 270 are a number of telephones and a number of transducer means associated with a first main distribution station 282 and a second main distribution station 284. More particularly, there is a first telephone 274 and a second telephone 276. There is also a first transducer means 278 and a second transducer means 280. These telephones and transducer means may be contained in one or more of the previously discussed local stations which are not within the intercom network 270.

The first main distribution station 282 and the second main distribution station 284 are similar to those previously discussed. However, in the FIG. 9 embodiment each of the main distribution stations is associated with the same transducer means. That is, both the first main distribution station 282 and the second main distribution station 284 are associated with the first transducer means 278 and with the second transducer means 280, and with any other transducer means which may be within the system.

The telephone exchange network 272 is also similar to those previously discussed. The network 272 includes an outside trunk 286 and a first internal trunk 288 and a second internal trunk 290. The network 272 also includes a first means 292, responsive to a first predetermined transducer means address signal transmitted by either the first telephone 274 or the second telephone 276, for switchably electrically connecting to the first internal trunk 288 the respective one of the first telephone or second telephone which is transmitting the first predetermined signal. This connection occurs so that the respective telephone is placed in communication with the transducer means addressed by the first predetermined signal. The network 272 further includes a second means 294, responsive to a second predetermined transducer means address signal transmitted by the other of the first telephone or second telephone which did not transmit the first predetermined signal. In response to the second predetermined signal the second means 294 switchably electrically connects this other telephone to the second internal trunk 290 so that this other telephone is placed in communication with the transducer means addressed by the second predetermined signal.

By way of specific example, assume that the first telephone 274 sends an access number (e.g., the signal digit "1") plus the address for the transducer means 278. The first means 292 will respond to the access signal "1" by connecting the telephone 274 to the first internal trunk 288 so that the transducer means address may be sent to the first main distribution station 282. When the first main distribution station 282 detects the address of the transducer means 278, the distribution station connects the transducer means 278 to the first internal trunk 288 so that communication is established between the calling telephone 274 and the called transducer means 278. When the first means 292 connects the telephone 274 to the first internal trunk 288, it causes the second means 294 to respond to the next call placed by any of the other telephones within the system. For example, if the telephone 274 has placed a call and is still in operation, then when the telephone 276 places a call during this period, the second means 294 will connect the telephone 276 to the second internal trunk 290 for transmitting the called transducer means' address to the second main distribution station 284 for detection thereby. When the second main distribution station 284 so detects the signal, it connects the addressed transducer means to the second main distribution station 284 for establishing a communication line between the second calling telephone and the second called transducer means. Because this system permits simultaneous access to the transducer means by more than one telephone, it is apparent that this system of interconnecting the components is of particular advantage where the communication traffic between the telephones and the transducer means is moderate to heavy.

Thus, the present invention of a communication system which combines telephone service with hands-free talk-back intercom service is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A system for combining telephone service with hands-free talk-back intercommunication service, said system comprising:

a hands-free talk-back intercommunication network including:
 a main distribution station having a talk channel and a listen channel;
 a plurality of local stations associated with said main distribution station, at least a first one of said local stations having a first telephone located thereat and at least a second one of said local stations having a first transducer means located thereat and said second local station also having means for connecting the first transducer means in balanced electrical connection with said main distribution station; and a telephone exchange network connected to said first telephone located at said first local station and also connected to said main distribution station;

means connected to said telephone exchange network for monitoring when said first telephone initiates a call to said second local station;

means, responsive to said monitoring means detecting the initiation of a call to said second local station, for selecting said first transducer means and for placing said called first transducer means in communication with said talk channel and listen channel;

means for providing an electrical interface between said talk channel and said listen channel and said telephone exchange network;

means associated with said interface means for balancing said interface;

first talk amplifier means connected to said interface means;

first means for setting a first level of loudness and second means for setting a second level of loudness wherein each of said first and second means is responsive to a first signal from said call monitoring means for selectable connection to said first talk amplifier means;

second talk amplifier means connected to said first and second level setting means for providing an output from said talk channel;

means connected to said second talk amplifier for switchably connecting said first transducer means to a respective one of said output from said talk channel and an input to said listen channel;

means connected to said switchable connecting means for providing said input to said listen channel and for activating an electrical signal for testing said balancing means;

means connected to said test activating means and to said interface means for automatically controlling the gain of said listen channel; and means connected to said interface means, said test activating means and said switchable connecting means for automatically controlling the switching by said switchable connecting means of said first transducer means to a respective one of said output of said talk channel and said input of said listen channel.

2. A system as recited in claim 1, wherein said telephone exchange network includes a private automatic branch exchange.

3. A system as recited in claim 1, wherein:
said first local station further includes:
a second transducer means; and
means for connecting said second transducer means in balanced electrical connection with said main distribution station; and
said second local station further includes a second telephone.

4. A system as recited in claim 3, wherein each of said balanced electrical connections of said first and second transducer means includes a single twisted pair of electrically conducting wires.

5. A system as recited in claim 1, wherein said transducer selecting means includes:
first switch means responsive to a second signal from said call monitoring means; and
second switch means manually switchable.

6. A system as recited in claim 5, wherein said call monitoring means includes:
means, responsive to a signal from said telephone exchange network, for enabling said monitoring means;
means for splitting the frequency bands of an address signal received from said telephone exchange network;
means for decoding the tones from said split frequency bands;
means, responsive to said tone decoding means, for activating said transducer selecting means; and
means, responsive to said tone decoding means, for supplying electrical power to said transducer selecting means.

7. A telephone and intercom system, comprising:
an intercom network including:
a first local station having a first telephone which has a tip and ring circuit;
a second local station having a first transducer means; and
a first main distribution station associated with said second local station, said first main distribution station having first means for establishing a talk channel and a listen channel; and
a telephone exchange network including:
an outside trunk for providing external telephone communications to said system;
a first internal trunk connected to said first talk channel and listen channel establishing means;

means connected to said first internal trunk for detecting a call being placed on said first telephone addressing said first transducer means;

means, responsive to command signals from said call detecting means, for selectively connecting said addressed transducer means to said first talk channel and listen channel establishing means;

first means for providing an interface between said first talk channel and listen channel establishing means and said first internal trunk, said first interface means including means for electrically balancing said interface;

a talk channel circuit connected to said first interface means, said talk channel circuit including a first amplifier means connected to said first interface means, and means connected to said first amplifier means for variably setting two separate levels of gain for automatically selecting one of said two levels in response to command signals from said call detecting means, and a second talk amplifier means connected to said setting and selecting means;

a listen channel circuit connected to said first interface means, said listen channel circuit including means for testing the balance of said balancing means of said first interface means, and means for automatically controlling the gain of said listen channel circuit, and second means responsive to signals from said first talk channel and listen channel establishing means, for providing an interface between said transducer selective connecting means and said talk channel and listen channel establishing means.

8. A system as recited in claim 7, wherein said second interface means includes:
a voice-operated relay connected to said transducer selective connecting means, said talk channel circuit and said listen channel circuit; and
means connected to said talk channel circuit, said listen channel circuit and said relay for controlling the switching by said voice-operated relay of said transducer selective connecting means to a respective one of said talk channel circuit and said listen channel circuit.

9. A system as recited in claim 7, wherein:
said intercom network further includes:
a third local station having a second transducer means; and
a second main distribution station associated with said third local station, said second main distribution station having second means for establishing a talk channel and a listen channel; and
said telephone exchange network further includes:
a second internal trunk connected to said second talk channel and listen channel establishing means; and
second means, responsive to a second predetermined signal transmitted from said first telephone, for switchably electrically connecting to said second internal trunk the tip and ring circuit of said first telephone.

10. A system as recited in claim 9, wherein:
said first talk channel and listen channel establishing means includes:
means connected to said firsst internal trunk for detecting a call being placed on said first telephone addressing said second local station;

means, responsive to command signals from said first internal trunk call detecting means, for selectively connecting the respective transducer means of said addressed second local station to said first talk channel and listen channel establishing means; and means connected to said first internal trunk for controlling the communications over said first talk channel and listen channel establishing means between said calling telephone and said addressed second local station; and said second talk channel and listen channel establishing means includes:

means connected to said second internal trunk for detecting a call being placed on said first telephone addressing said third local station;

means, responsive to command signals from said second internal trunk call detecting means, for selectively connecting the respective transducer means of said addressed third local station to said second talk and listen channel establishing means; and means connected to said second internal trunk for controlling the communications over said second talk channel and listen channel establishing means between said calling telephone and said addressed third local station.

11. A system as recited in claim 10, wherein each of said first and second talk and listen channel communications controlling means includes:

a respective first means for providing an interface between the respective talk and listen channel establishing means and the respective internal trunk, said interface means including means for electrically balancing the respective interface;

a respective talk channel circuit connected to the respective first interface means, said talk channel circuit including:

first amplifier means connected to the respective first interface means;

means connected to the respective first amplifier means for variably setting two separate levels of gain and for automatically selecting one of said two levels in response to command signals from the respective call detecting means; and second talk amplifier means connected to said setting and selecting means;

a respective listen channel circuit connected to the respective first interface means, said listen channel circuit including:

means for testing the balance of said balancing means of said respective first interface means; and means for automatically controlling the gain of said listen channel circuit; and a respective second means, responsive to signals from the respective talk and listen channel establishing means, for providing an interface between the respective transducer selective connecting means and the respective talk channel and listen channel establishing means.

12. A system as recited in claim 11, wherein each of said respective second interface means includes:

a voice-operated relay connected to the respective transducer selective connecting means, talk channel circuit and listen channel circuit; and means connected to the respective talk channel circuit, listen channel circuit and relay for controlling the switching by said voice-operated relay of the respective transducer selective connecting means to either the respective talk channel circuit or the respective listen channel circuit.

13. A telephone and intercom system, comprising:

an intercom network including:

a first telephone;

a second telephone;

a first transducer means;

a second transducer means;

a first main distribution station associated with said first and second transducer means and having a first means for establishing a talk channel and a listen channel; and a second main distribution station associated with said first and second transducer means and having a second means for establishing a talk channel and a listen channel; and a telephone exchange network including:

an outside trunk for connecting external telephone communications to said system;

a first internal trunk connected to the first talk channel and listen channel establishing means of said first main distribution station;

first means, responsive to a first predetermined transducer means address signal transmitted by either said first telephone or said second telephone, for switchably electrically connecting to said first internal trunk the respective one of said first and second telephones transmitting the first predetermined signal so that said respective telephone is placed in communication with the transducer means addressed by the first predetermined signal;

a second internal trunk connected to the second talk channel and listen channel establishing means of said second main distribution station; and second means, responsive to a second predetermined transducer means address signal transmitted by the other of said first or second telephones not transmitting said first predetermined signal, for switchably electrically connecting said other telephone to said second internal trunk so that said other telephone is placed in communication with the transducer means addressed by the second predetermined signal; and wherein said first talk channel and listen channel establishing means includes means connected to said first internal trunk for detecting a call being placed on one of said telephones addressing one of said transducer means, means responsive to command signals from said first internal trunk call detecting means for selectively connecting the respective addressed transducer means to said first talk channel and listen channel establishing means, and a means connected to said first internal trunk for controlling the communications over said first talk channel and listen channel establishing means between said telephone and said addressed transducer means; and said second talk channel and listen channel establishing means includes means connected to said second internal trunk for detecting a call being placed on one of said telephones addressing one of said transducer means, and means responsive to command signals from said second internal trunk call detecting means for selectively connecting the respective addressed transducer means to said second talk and listen channel establishing means, and a means connected to said second internal trunk for controlling the communications over said second talk channel and listen channel establishing means between said calling telephone and said addressed transducer means.

14. A system as recited in claim 13, wherein each of said first and second talk and listen channel communications controlling means includes:
a respective first means for providing an interface between the respective talk and listen channel establishing means and the respective internal trunk, said interface means including means for electrically balancing the respective interface;
a respective talk channel circuit connected to the respective first interface means, said talk channel circuit including:
first amplifier means connected to the respective first interface means;
means connected to the respective first amplifier means for variably setting two separate levels of gain and for automatically selecting one of said two levels in response to command signals from the respective call detecting means; and
second talk amplifier means connected to said setting and selecting means;
a respective listen channel circuit connected to the respective first interface means, said listen channel circuit including:
means for testing the balance of said balancing means of said respective first interface means; and
means for automatically controlling the gain of said listen channel circuit; and
a respective second means, responsive to signals from the respective talk and listen channel establishing means, for providing an interface between the respective transducer selective connecting means and the respective talk channel and listen channel establishing means.

15. A system as recited in claim 14, wherein each of said respective second interface means includes:
a voice-operated relay connected to the respective transducer selective connecting means, talk channel circuit and listen channel circuit; and
means connected to the respective talk channel circuit, listen channel circuit and relay for controlling the switching by said voice-operated relay of the respective transducer selective connecting means to either the respective talk channel circuit or the respective listen channel circuit.

* * * * *